Oct. 10, 1950
S. SMILANSKY
2,525,379
TORQUE TOOL
Filed Aug. 3, 1946
3 Sheets-Sheet 1
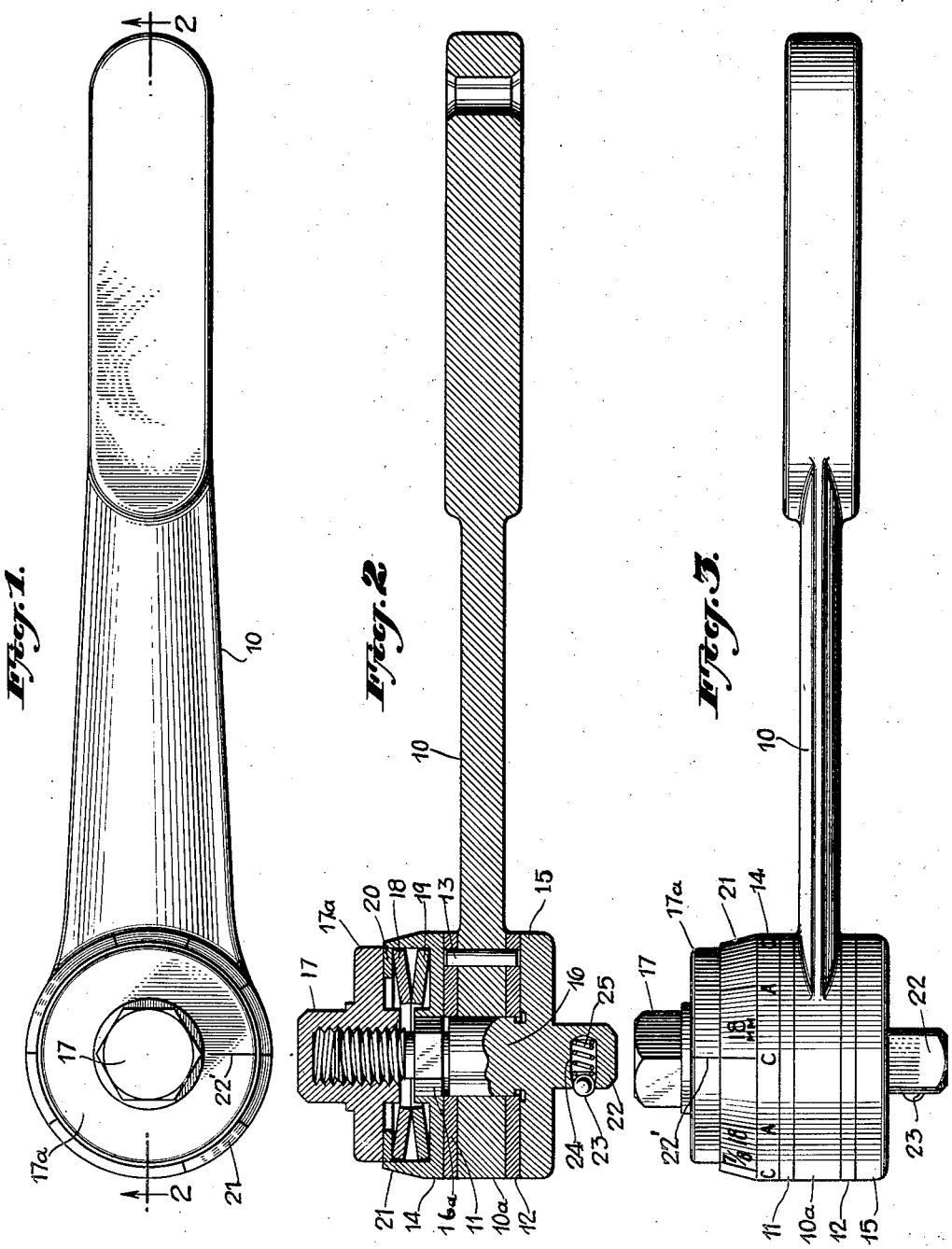
INVENTOR.
STEPHEN SMILANSKY.
BY Ward, Crosby & Neal
ATTORNEYS.

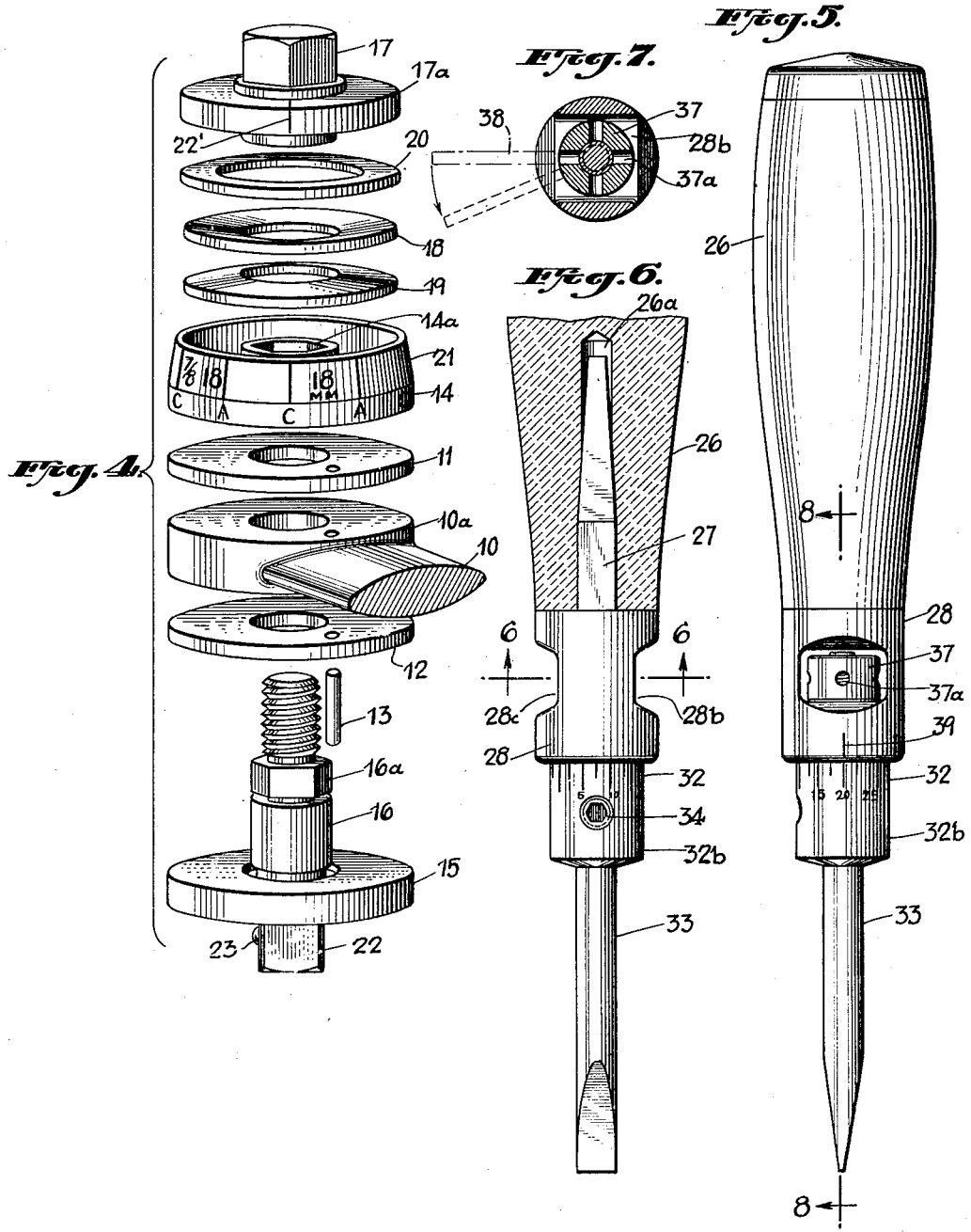

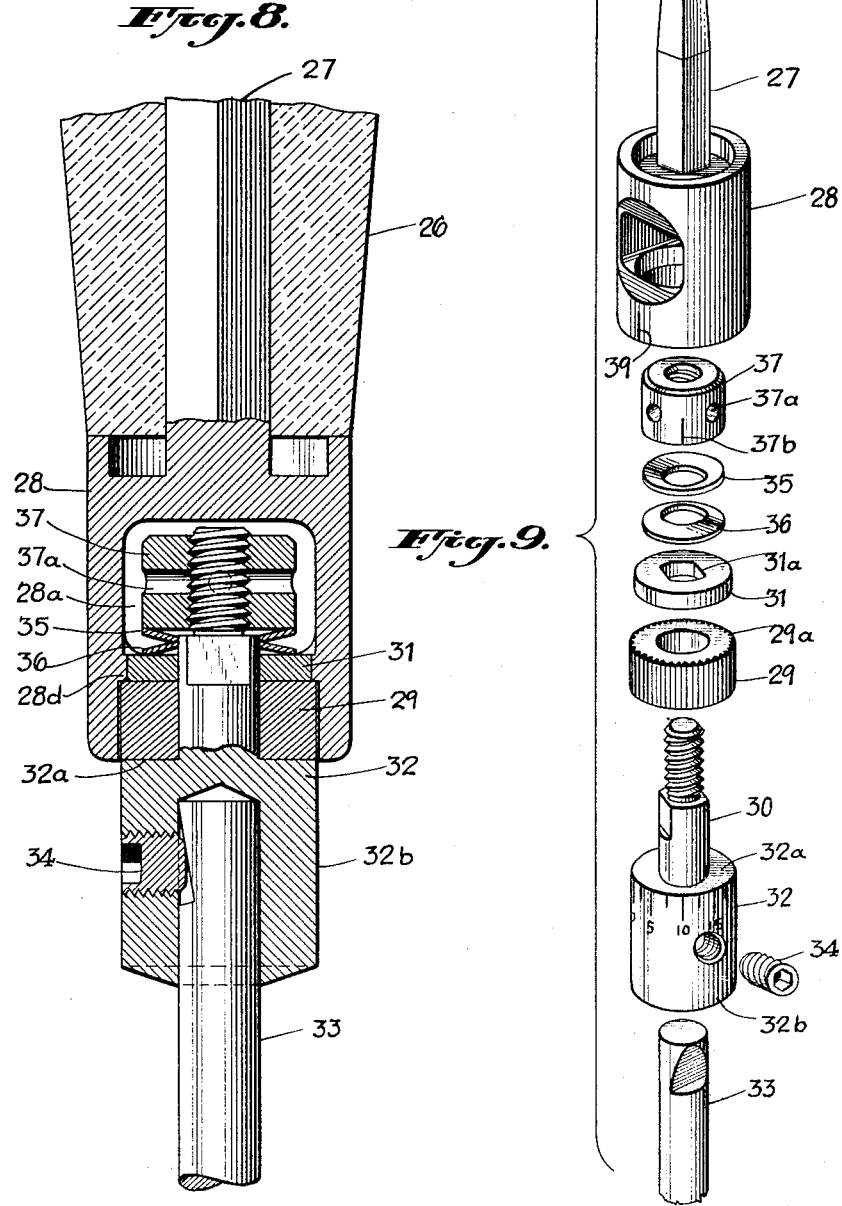

Patented Oct. 10, 1950

2,525,379

UNITED STATES PATENT OFFICE 2,525,379

TORQUE TOOL

Stephen Smilansky, New Canaan, Conn., assignor to Airdraulics Engineering, Inc., New Canaan, Conn., a corporation of Connecticut Application August 3, 1946, Serial No. 688,229

1 Claim. (Cl. 64—30)

This invention relates to torque tools, and more particularly to tools for exerting a predetermined torque and which automatically slip when the predetermined torque is exerted.

It has been found highly desirable in many instances of manufacturing or of repair work on machinery or the like to exert a predetermined controllable torque upon bits, braces, nuts or bolts and related devices. This is desirable, for example, in order to avoid stripping the threads from a nut or bolt. It has been found highly objectionable, for example, in the tightening of cylinder head bolts, to apply unequal pressure thereto whereby the engine block studs are elongated by differing amounts, thus causing warpage of cylinder walls. The same is true with respect to the tightening of spark plugs in internal combustion engines.

Torque tools such as wrenches and screw drivers have been heretofore proposed which slip at predetermined torques but such tools have been very bulky, heavy and unwieldy.

In addition to the above, such tools heretofore employed have been prohibitively expensive for the average user and the accuracy thereof has left much to be desired.

Moreover, torque tools having slip clutches heretofore employed, because of their bulk and weight, have been ill adapted for reaching hidden or difficult locations.

Also slip clutch torque tools employed before have required an exact knowledge by the user of the necessary or desirable torque for a wide variety of nuts, bolts, spark plugs and the like making it necessary for a user to refer to complicated tables and charts to obtain the proper adjustment.

It has been found that slip clutch torque tools previously used have, after continued use for extended periods of time, lost their accuracy as to adjustment of torques at which slippage is desired, and that uniformity in the coefficient of friction in such clutches has been lost. That is, these tools have not been capable of continued precision service.

Also the devices of this nature in the prior art have been easily affected by oil and dirt and have been of complicated construction which has been easily deranged.

Torque tools of the above character have been heretofore proposed having various types of clutches and various means for controlling the engagement of said clutches. However, these types have been too high in cost.

Many of the devices of this nature heretofore employed have been subject to inaccuracies due to foreign matter which has been able to work its way into the mechanism causing same to clog or altering the coefficient of friction. Also said devices have been subject to unequal wear and to rapid deterioration.

According to the present invention a torque tool is provided for exerting a predetermined torque upon a nut, a bolt, a drill or the like which will eliminate the above noted difficulties or reduce same to insignificance.

Various further and more specific features and advantages of the invention will clearly appear from the detailed description given below taken in connection with the accompanying drawings which form a part of this specification and illustrate, by way of example, preferred arrangements of apparatus for carrying out the invention. The invention constitutes such novel combinations of features and apparatus as may be shown and described in connection with the device herein disclosed.

Fig. 1 is a top plan view of a torque wrench illustrating one embodiment of the invention;

Fig. 2 is a side elevation partly in section and with parts broken away of the embodiment shown in Fig. 1;

Fig. 3 is a side elevation of the embodiment of Fig. 1;

Fig. 4 is an exploded view partly in section of the embodiment shown in Fig. 1;

Fig. 5 is a side elevation of a novel screw driver illustrating a second embodiment of the present invention;

Fig. 6 is a side view partly in section and with parts broken away of the embodiment illustrated in Fig. 5;

Fig. 7 is a sectional view taken on line 6—6 of Fig. 6;

Fig. 8 is an enlarged view in detail partly in section and with parts broken away of the embodiment shown in Fig. 5; and Fig. 9 is an exploded view of the parts of the invention illustrated in Fig. 8.

Various means have been used to measure and control torque in torque tools such as wrenches and screw drivers. Of all of these means the friction disc type has proved the simplest and the most accurate. Such tools have in many cases required the operator or user to measure the amount of torque which is being applied by observing a suitable scale thereon. This of course requires the operator to release his manual pressure when the torque has reached the desired value. Such types of wrenches may leave it to the skill of the operator to determine when the proper torque has been applied. This may be impossible or it may be difficult for the user to observe a torque scale while the tool is in actual use because it may be employed in confined or inaccessible places.

In order to provide a torque tool which is easy to manufacture and relatively inexpensive it is necessary to employ a simple and rugged type of device which may be inserted into small spaces and which is easily handled, that is, it must be of relatively light weight.

In the embodiment shown in Figs. 1-4 the novel torque tool is constituted by a handle 10 which preferably is of cast or forged aluminum and may be of any convenient length, for example, 15 inches. It is provided with a hub portion 10a which is operatively associated with a novel multiple disc clutch member to be described below.

The driving member of the clutch is, of course, the manually operable handle 10 and a driven member is provided which is in turn drivably connected to a suitable work engaging member or "drive."

The novel clutch employed in the present invention is constituted by a pair of friction plates 11 and 12 which preferably are rigidly mounted upon the hub member 10a upon opposite faces thereof. The friction plates 11 and 12 are preferably flat and are held closely against the mutually contiguous surfaces of the hub portion 10a. Said plates may be mounted rigidly upon the hub member by means of a dowel 13 which may extend through the hub portion, and which preferably is of such a length that it does not project beyond the outer surface of said plates. A second dowel (not shown) diametrically opposed to dowel 13 may be provided if desired.

It is desirable that the friction plates 11 and 12 be constituted by a compressed porous cuprous material which may be sintered. Said cuprous material may, for example, include copper and one or more of the following: tin, lead, iron, and silica. The designation "compressed porous cuprous material" may include within the purview thereof pressed powderd bronze or compressed comminuted cuprous material or pressed powdered cuprous material.

Novel means are provided for engaging said friction plates comprising, for example, a pair of friction discs 14 and 15 which may be mounted upon a driven clutch shaft 16. Discs 14 and 15 may be referred to respectively as primary and secondary friction discs or members. The discs 14 and 15 are preferably of a ferrous metal. The combination of the compressed porous cuprous material and the ferrous metal which is in frictional contact therewith, provides a slip clutch of high accuracy and durability. The coefficient of friction between these two materials is extremely desirable in tools of this kind, and in combination with novel means for controlling the frictional pressure provides unexpectedly accurate results between wide torque limits.

The disc 15 preferably is rigidly attached to the shaft 16. The disc 14 is adapted for axial movement upon and angular movement with the shaft 16, for example, by means of a hexagonal portion 16a of said shaft 16 which engages a hexagonal central bore 14a in the disc 14.

The shaft 16 is provided at the extremity thereof opposite to that of disc 15, with suitable threads for engaging a torque adjustment nut 17 to be described more fully hereinafter.

In order to increase the compactness of the torque wrench, that is, in order to reduce to a minimum the size of the clutch, and in order to provide an extremely accurate and durable means for controlling the pressure exerted upon the clutch, novel pressure control means for the clutch are interposed between the adjusting nut 17 and the friction disc 14. Said novel means comprise a plurality of resilient dished washers or spring members. In the embodiment shown, there are two such members 18 and 19. Said dished washers may be provided with central apertures or bores through which the shaft 16 extends into threaded engagement with the adjusting nut 17. The latter nut may be provided with a suitable hexagonal periphery to facilitate adjustment by means of a wrench. Preferably integral with the nut 17 is a flange 17a which is adapted for cooperation with said resilient members for transmitting pressure to the clutch in a manner to appear hereinafter.

It is desirable for the dished members to be mounted upon the shaft 16 with the peaks thereof adjacent one another. Said members 18 and 19 are sometimes referred to as "Belleville Springs." They may be of substantial thickness, for example, .110 inch, with an inner diameter of ⅞ inch and an outer diameter of 1¾".

In order to insure a uniform contact of the adjusting nut 17 with the uppermost of the dished members (Belleville spring 18), a suitable friction washer 20 may be interposed therebetween.

In tools of this character it is highly desirable that the adjustment thereof to any desired slip torque may be made accurately and rapidly, and without the necessity for a multiplicity of revolutions of the adjusting means. For example, it is advantageous that the full range of slip torque adjustments may be made with substantially one revolution of the adjusting nut 17.

Said range of slip torque adjustments, of course, should be as wide as the particular needs require for the type of work being undertaken. For example, the range of adjustments may be within the limits of zero to 50 foot pounds, and within one revolution of the adjusting nut 17.

The limits of the range of adjustments is a function of the thickness, inside and outside diameters and amount of dish of the dished members, the resilient qualities of the metal employed, and the pitch of the threads upon which the adjusting nut 17 moves.

It is, of course, possible to attain an extremely wide range of adjustments if such is necessary by means of only a single revolution of the adjusting nut, by controlling the above factors.

Novel means are provided for indicating the compression of the Belleville springs and thus for indicating the pressure upon the novel clutch above described, comprising a graduated peripheral flange 21 about, for example, the margin of friction disc 14.

The graduated flange 21 in combination with said disc 14 comprises a housing for the Belleville springs. Consequently the flange 21 serves the dual purpose of a member for protecting an important portion of the clutch and also for providing a member upon which a suitable scale may be placed.

Said scale may comprise, for example, graduations indicating slip torque reading in foot pounds, or reading in terms of the type of part which is to be tightened. If the torque wrench is to be employed for tightening spark plugs, the scale marked upon the flange 21 may be graduated to indicate various sizes of spark plugs. That is, a suitable index 22' marked upon the adjusting nut 17 may be angularly shifted to the proper graduation for the particular size spark plug being tightened. As shown in Fig. 3 graduations are indicated for a spark plug having a diameter of 18 mm., and one of 7/8 of an inch and for tightening in an aluminum head indicated by A or cast iron head indicated by C.

The combination of the axially adjustable nut 17 acting in cooperation with the graduated housing provides unexpected compactness together with a very wide range of torque adjustments. The novel means for communicating pressure to the frictionally engaged members of the clutch is simple and impervious to oil and foreign matter.

The wrench does not induce eyestrain or a misreading of dials and there are no delicate springs or parts which may become easily defective.

Suitable conventional means may be associated with the shaft 16 for engaging a brace, a drill or a socket wrench or the like comprising a drive member 22 preferably adjacent that extremity of shaft 16 which is opposite to adjusting nut 17. Conventional means may be associated with the drive member 22 for retaining a work engaging member, such as the above mentioned drill or bit, comprising a resiliently mounted detent ball 23 which may be positioned within a bore 24 in said drive member and resiliently held in a partially exposed position by means of a coil spring 25 in said bore.

In operation a suitable work engaging tool (not shown) is applied to the drive member 22, for example, a tool adapted for engaging a spark plug. Power is applied to the handle 10 which is transmitted to the friction plates 11 and 12 by means of the dowel 13 causing said plates to shift angularly with the handle 10. This angular motion, of course, tends to entrain the driven shaft 16 through the intermediary of the discs 14 and 15 in frictional contact therewith. The driven shaft 16 will move angularly with the handle 10 until the torque reaches the amount for which the wrench has been adjusted whereupon, by virtue of the reluctance of the part being tightened to rotate there will be a slippage between the contiguous surfaces of the friction plates and discs above described.

Very small or extreme resilient pressure may be exerted upon the frictionally engaged clutch surfaces by axially adjusting or angularly shifting the nut 17 whereby the index 22' thereupon is positioned at a desired calibration upon the flange 21.

The combination of the above described Belleville springs or dished washer members, which drastically reduce the size of the clutch member, plus the ferrous and compressed porous cuprous materials as portions of the clutch, provides a durable slip clutch which may be adjusted with precision and which is so constructed and arranged that it can be adjusted to slip at a uniform torque for any given setting thereof and over a long period of time. The introduction of, for example, silica and/or lead into the material comprising the cuprous clutch members aids in producing a smooth and nonchattering slippage, which thus lengthens the life of the frictionally engaged members and maintains at a uniform point the coefficient of friction between these members. It thus helps to maintain accuracy of the tool.

A second embodiment of the invention is illustrated in Figs. 6-9 comprising a screw driver having a clutch member which is analogous to that of the wrench above described.

The novel screw driver is constituted by a handle portion 26 which is operatively connected to a driving member of the screw driver clutch by means of a stud 27, preferably of square cross section which engages a bore 26a in the handle 26. The stud 27 may be rigidly attached to a clutch housing member 28 which also constitutes the driving member of the clutch. The housing member 28 has a relatively large central bore 28a therein which may contain in its entirety the clutch member of the screw driver. In order to permit adjustment of the screw driver clutch, suitable ports 28b, 28c are cut in the housing 28 thus exposing a portion of the bore 28a, and an adjusting nut therewithin which will be described hereinafter.

At the lower extremity of the housing 28 as viewed in Fig. 8 there may be attached a friction plate 29 which may be rigidly associated and adapted for angular movement with said housing, for example, by means of suitable serrations 29a as illustrated in Fig. 9. Plate 29 may be "press fitted" into housing 28.

The friction plate 29 preferably is of compressed porous cuprous material, and is analogous to the friction plates 11 and 12 of the torque wrench. The friction plate 29 preferably is engaged on opposite faces thereof by suitable friction discs which are operatively associated with a driven clutch shaft 30. Said friction discs comprise in the embodiment shown a member 31 in the nature of a washer having a central bore 31a (Fig. 9) therethrough. Said bore may be flattened to cooperate with flattened surfaces of the shaft 30 whereby the friction disc 31 is adapted for axial movement upon said shaft but is constrained to shift angularly therewith.

The opposite friction disc is constituted by a member 32 which may be integral with the shaft 30 and which has a friction surface 32a for contacting said friction disc 29.

In order that an axial thrust may be communicated by the housing 28 to the tool being driven by the screw driver an inner shoulder 28d is provided above and immediately adjacent the friction plate 29. The inner shoulder 28d is, of course, formed within the bore 28a and preferably surrounds the friction disc 31. A downward axial thrust thus may be communicated through said shoulder 28d, plate 29, and friction member 32 to, for example, a bit or tool 33 which may be rigidly held in a tool adapted 32b which may be integral with the disc 32. A set screw 34 may be employed for fixing the tool in the adapter. The close fit or "press fit" of plate 29 in housing 28 assists in communicating axial thrust to tools.

Novel pressure control means are provided for the screw driver clutch comprising a plurality of dished resilient washers or Belleville springs. In the embodiment shown two such washers 35, 36 are employed.

The Belleville springs or washers 35, 36 are interposed preferably between the friction disc 31 and a threaded adjusting nut 37 which threadedly engages driven shaft 30.

The adjusting nut 37 is provided with a plurality of transverse bores 37a into which an adjusting pin 38 (Fig. 7) may fit.

The operation of the screw driver is analogous to that of the above described wrench.

The member 32 which constitutes one of the friction discs, as above mentioned, also serves as a tool adapter. The outer surface of the adapter may be calibrated to indicate, for example, foot or inch pounds of torque. These calibrations are adapted for cooperation with an index 39 which may be marked upon the outer surface of member 28 preferably directly beneath the center of one of the side ports 28b, 28c of member 28. An index 37b (Fig. 9) may be marked upon the adjusting nut 37 for association with the index 39.

In order to adjust the clutch of the screw driver to slip at a desired torque, for example, at ten inch pounds, the adjusting nut 37 is loosened and the calibrated bit adapter is angularly shifted until the desired number (10) is directly beneath the index 39. The adjusting nut 37 then is turned by means of the adjusting pin 38 until the index 37b is in alignment with the index 39, and the desired inch pound calibration (10).

One full revolution of the adjusting nut 37 is adapted for moving through the full torque range.

While the invention has been described with respect to certain preferred examples which have given satisfactory results, it will be understood by those skilled in the art after understanding the invention that various changes and modifications may be made without departing from the spirit and scope of the invention, and it is intended, therefore, in the appended claim, to cover all such changes and modifications.

What is claimed as new and desired to be secured by Letters Patent is:

In a torque tool of the class described, the combination comprising a handle having a hub portion rigidly associated therewith, a shaft adapted for connection to the work to be driven and passing through a bore in said hub portion, a pair of discs formed of compressed porous cuprous material and secured against rotation on opposite faces respectively of said hub portion, the shaft passing through said discs and being rotatable in respect thereto, a pair of friction discs with faces respectively engaging said discs of cuprous material, said friction discs being formed of ferrous metal and one of same being fixed against movement with respect to said shaft and the other being fixed against rotation upon said shaft but being movable axially of the shaft, the latter friction disc on its face opposite the cuprous disc being formed with an annular cavity surrounded by a generally cylindrical portion bearing a graduated dial on its outer surface, a plurality of annular resilient dished members surrounding said shaft within said cavity, and a slip torque adjusting member in threaded engagement with said shaft for applying adjustable pressure tending variably to flatten said dished members within said cavity to thereby adjust the pressure between said cuprous discs and said friction discs, said adjusting member having a flange covering said cavity and adapted to bear an index mark for cooperation with said graduated dial.

STEPHEN SMILANSKY.

REFERENCES CITED

The following references are of record in the file of this patent:

UNITED STATES PATENTS

| Number | Name | Date |
|---|---|---|
| 458,408 | Schwanhausser | Aug. 25, 1891 |
| 1,433,590 | Ziegler | Oct. 31, 1922 |
| 2,136,438 | Horsrud | Nov. 15, 1938 |
| 2,360,488 | Garman | Oct. 17, 1944 |
| 2,427,153 | Mossberg | Sept. 9, 1947 |
| 2,429,561 | Miller | Oct. 21, 1947 |
| 2,449,034 | Zimmerman | Sept. 7, 1948 |

FOREIGN PATENTS

| Number | Country | Date |
|---|---|---|
| 703,769 | Germany | Mar. 15, 1941 |